United States Patent [19]

Rogers et al.

[11] Patent Number: 4,776,404
[45] Date of Patent: Oct. 11, 1988

[54] MULTIPLE UNIT TURF AERATOR

[75] Inventors: Steven D. Rogers, Olathe; William E. Daniels, Jr., Paola, both of Kans.

[73] Assignee: Olathe Manufacturing, Inc., Industrial Airport, Kans.

[21] Appl. No.: 935,816

[22] Filed: Nov. 28, 1986

[51] Int. Cl.[4] .................. A01B 45/02; A01B 29/00
[52] U.S. Cl. .......................... 172/21; 172/551
[58] Field of Search .............. 172/572, 21, 22, 551, 172/705, 310, 579; 111/55, 59, 62, 65, 85, 52

[56] References Cited

U.S. PATENT DOCUMENTS

| 2,155,443 | 4/1939 | Parks | 111/85 X |
| 2,796,712 | 6/1957 | Miller | 172/572 |
| 2,979,138 | 4/1961 | Martinson | 172/572 X |
| 3,094,315 | 6/1963 | Yetter | 172/573 X |
| 3,247,812 | 4/1966 | Luciano | 172/21 |
| 3,643,746 | 2/1972 | Dedoes | 172/22 |
| 3,650,331 | 3/1972 | Dedoes | 172/21 |
| 3,756,203 | 9/1973 | Dedoes | 172/22 |
| 4,271,911 | 6/1981 | van der Lely | 172/68 |
| 4,418,761 | 12/1983 | Dietrich | 172/551 |

FOREIGN PATENT DOCUMENTS 480212 2/1977 Australia .............. 172/572

Primary Examiner—Richard J. Johnson
Attorney, Agent, or Firm—Hovey, Williams, Timmons & Collins

[57] ABSTRACT

An implement for aerating and dethatching golf courses, athletic fields and other sodded fields has multiple aerator units each including a plurality of earth piercing aerator elements mounted on a shaft. Arms of each aerator unit supporting the shafts are independently swingable to move the shafts between horizontal positions and positions inclined from horizontal in accordance with the contour of the ground or encountered soil conditions as the aerator is advanced across the earth. A spring assembly urging each aerator unit toward the ground has structure for causing any upward swinging movement of the arms of each unit to be resisted by the weight of the frame whenever such arms are pivoted upwardly past a predetermined elevation, in order to provide additional force where highly compacted soil conditions are found. Springs common to adjacent aerator units engage a bracket that is shiftably connected to adjacent arms of the units to enable the common spring to direct its extension force on the arm which is in the higher position.

5 Claims, 2 Drawing Sheets

U.S. Patent    Oct. 11, 1988    Sheet 1 of 2    4,776,404
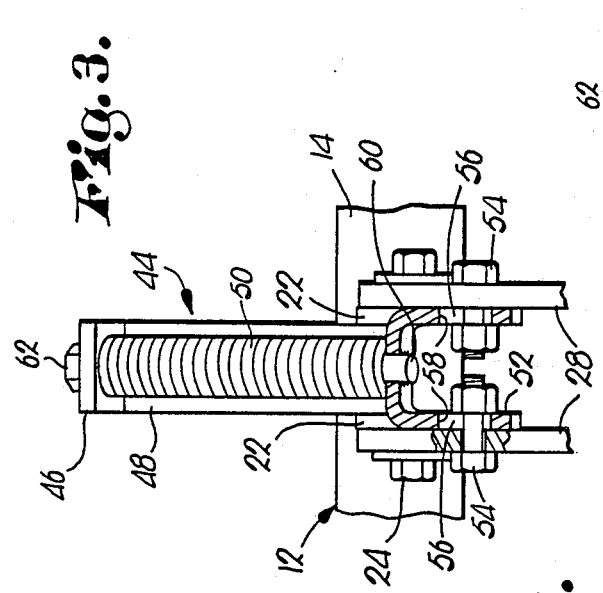
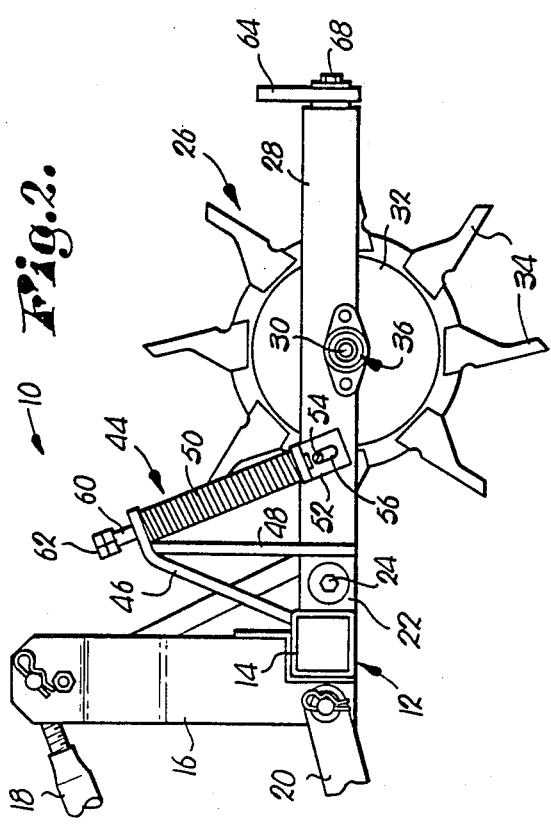

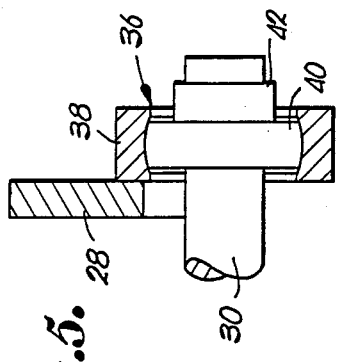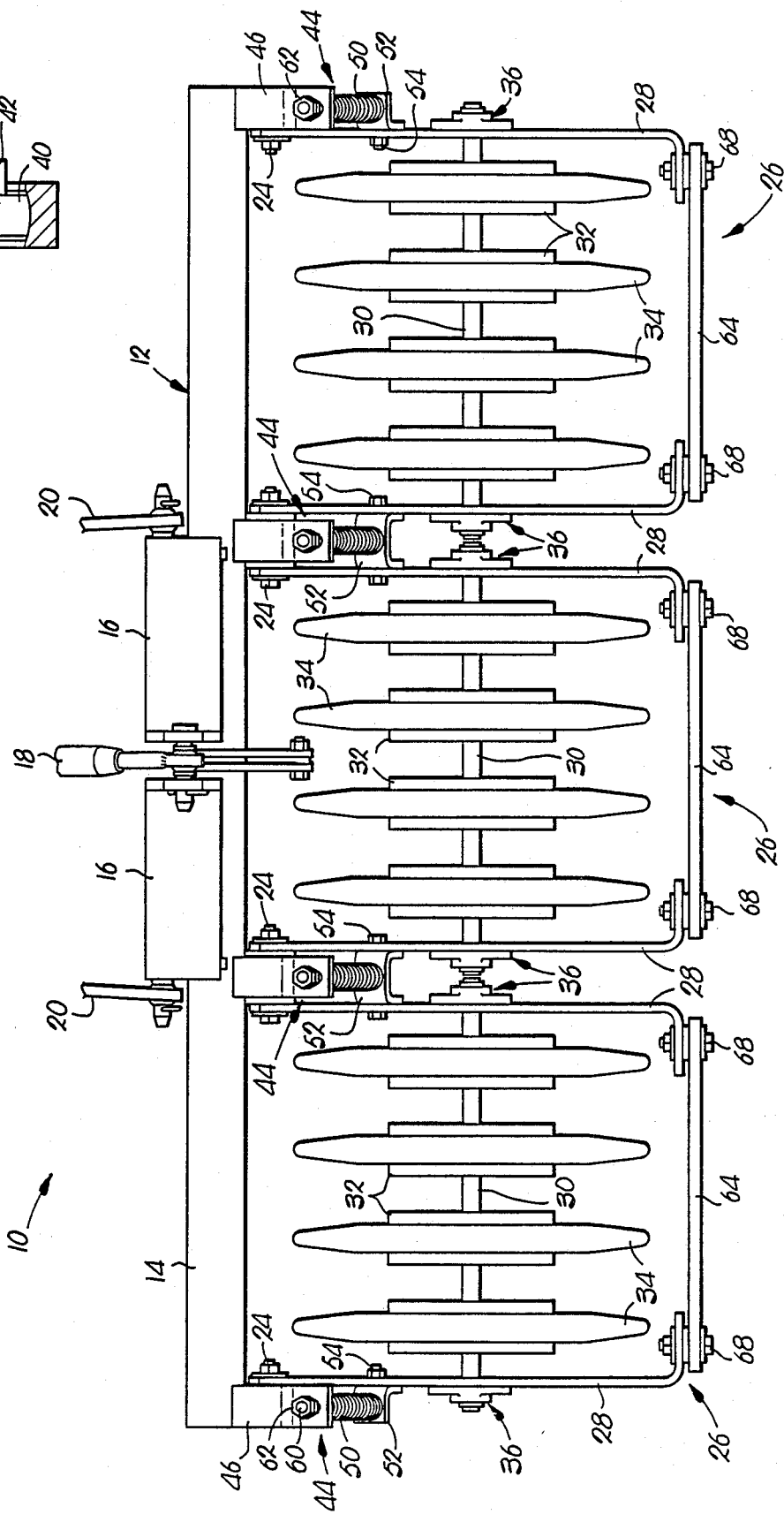

MULTIPLE UNIT TURF AERATOR

BACKGROUND OF THE INVENTION

1. Field of the Invention

This invention relates to an implement for aerating grass covered ground and includes multiple aerator units having respective aerator shafts that are mounted to a support of the implement for up and down swinging movement parallel with horizontal as well as pivotal movement toward a position inclined relative to horizontal in order to enable each of the shafts and aerator elements carried thereon to independently follow the contour of the ground. A spring assembly and optional weights mounted on arms supporting the aerator shafts bias the aerator elements into the ground as the implement is advanced, and preferably the spring assembly has structure for causing upward swinging movement of each aerator unit to be resisted by the weight of the implement support frame whenever such unit is pivoted upwardly past a certain, predetermined elevation.

2. Description of the Prior Art

The advantages of aerators are widely known to individuals responsible for maintaining a healthy, vigorous stand of grass on golf courses, athletic fields, lawns or other areas which are sodded. In general, aerators include a plurality of earth piercing elements which penetrate the ground as the implement is advanced along the field in order to prune root growth, aerate the soil and thatch the existing turf while leaving remaining portions of the seeded areas untouched so that normal use of the turf subsequent to the aerating operation is not substantially limited.

Certain types of known larger aerators are adapted to be pulled by a towing vehicle such as a tractor, and include one or more aerator units or sections. Each of the units includes a horizontal shaft supporting a bank of freely rotatable aerator hubs, and each hub carries a plurality of each penetrating elements which extend radially outwardly relative to the shaft. As the implement is advanced across the ground, the hubs rotate and the aerator elements penetrate spaced regions of the turf to stimulate growth and improve conditions for reseeding without unnecessarily exposing the lawn to damage due to washouts or other conditions.

However, conventional multiple gang aerators are not entirely satisfactory for a number of reasons. In general, aerator units which are pivotally mounted to a frame or support of the unit permit up and down swinging movement of each unit only in such a fashion that the longitudinal axis of the shaft carrying the aerator elements is retained in a horizontal position, such that the shaft of each of the units cannot individually be tilted to more precisely follow any inclination in the contour of the ground. In addition, the aerator elements of known implements are urged toward the ground only by the influence of the mass of the respective unit and any weights carried thereon. Thus, each of the units is swingable upwardly when dense or highly compacted soil conditions are encountered, thereby causing inadequate depth of penetration of the aerator elements in regions where such aeration is most desirable.

SUMMARY OF THE INVENTION

In order to overcome the above noted disadvantages, our present invention contemplates the provision of a multiple unit turf aerator wherein each of the units is pivotally swingable to any one of a number of inclined positions as the aerator is advanced across the ground so that the aerator shaft of each unit follows in parallel with the contour of the ground and each of the aerator elements pierces the earth to substantially the same depth. Moreover, a spring assembly coupled to the aerator units and a frame of the implement biases the units toward the ground and exerts the most force on the upwardmost unit. The assembly also includes means for causing the weight of the implement frame to bear against any of the units when such units are lifted upwardly past a certain elevation in order to provide additional force for causing the aerator elements to penetrate the ground when dense or highly compacted soil is encountered.

More particularly, we provide each unit of the aerator with independently swingable arms and pivot means mounting the forward portion of each arm to a transverse support of the frame. Each aerator shaft is connected by means of two spherical bearings to mid-portions of the independently swingable arms to permit the shaft to be raised and lowered in parallelism with horizontal as well as enabling independent, swinging movement of each aerator shaft about a transverse horizontal axis to any one of a number of inclined positions in accordance with the contour of the ground or particular soil conditions that are encountered.

The spring assembly for urging the aerator units toward the ground includes a compression spring extending between a member fixed to the frame of the implement and a bracket that is connected to adjacent arms of adjacent aerator units. The bracket is shiftably connected to the adjacent arms by means of two bracket slots which receive bolts fixed to respective arms so that the bias of the spring is presented to the upwardmost arm. When either of the arms of the respective aerator units shifts the bolt to the upper end of the bracket slot and also causes the spring to be in full compression, further upward movement of such arm is significantly resisted by the weight of the implement frame to cause an additional force to be exerted on the aerator elements as may occur when dense or uneven soil conditions are encountered.

Optional weights which are detachably connected to each unit have horizontal slots which receive a bolt extending rearwardly from a rear portion of each arm. The slots allow the distance between the rear portion of each aerator unit arm to vary to consequently permit free, independent swinging movement of the arms.

BRIEF DESCRIPTION OF THE DRAWINGS

FIG. 1 is a rear elevational view of the multiple unit turf aerator of the present invention wherein aerator elements are depicted in schematic form and end aerator units are shown for exemplary purposes as being pivoted to inclined positions parallel with the contour of the ground;

FIG. 2 is a fragmentary, side cross-sectional view of the aerator shown in FIG. 1 taken between the left hand and center aerator depicted in FIG. 1 to show components of a spring assembly biasing the aerator units toward the earth;

FIG. 3 is a fragmentary, enlarged rear sectional view of the spring assembly shown in FIG. 2;

FIG. 4 is a fragmentary, plan view of the aerator shown in FIG. 1 except that all of the units have been moved to an aligned, horizontal orientation for illustrative purposes; and FIG. 5 is a fragmentary, enlarged, rear cross-sectional view of a spherical bearing mounting an end portion of an aerator shaft to one of the swingable arms.

DETAILED DESCRIPTION OF THE DRAWINGS

A multiple unit turf aerator implement is broadly designated by the numeral 10 in FIGS. 1–5 and is adapted for attachment to a towing vehicle such as a tractor (not shown) having a conventional three-point hitch of the type well known in the art. The aerator 10 includes a frame 12 with a lower, horizontally extending beam support 14 and two upstanding bars 16 that are fixed to the support 14 and are inclined inwardly toward the center of frame 12. The upper end region of each bar 16 pivotally receives an upper, free swinging, center stabilizing link 18 (see FIGS. 2 and 4) of the three-point hitch, while two lower, powered lifting links 20 are coupled by means of a pin to a lower region of a respective one of the bars 16.

Six relatively short legs 22 are fixed in spaced relationship along the length of the normally horizontal support 14 and extend rearwardly in transverse relationship which can be best appreciated by reference to FIG. 2. Each of the legs 22 has a central hole which receives a pivot 24 for purposes to be explained hereinafter.

The aerator 10 as shown in FIGS. 1 and 4 has, for exemplary purposes only, three aerating units 26. Each of the units 26 has two spaced, elongated arms 28 with a forward end portion that is coupled by one of the pivots 24 to a respective leg 22. Each arm 28 is movable relative to respective leg 22 for independent, up and down swinging motion about a common, normally horizontal axis which extends through all of the pivots 24 and which is parallel to the longitudinal axis of support 14.

Each of the aerator units 26 includes an elongated, cylindrical shaft 30 that extends between mid portions of the spaced arms 28, 28 as is perhaps best viewed in FIG. 4. Four hubs 32 (see also FIG. 2) are spaced along the length of each of the shafts 30 and are mounted for free rotation thereabout. Each hub 32 fixedly carries eight ground engageable aerator elements 34 (FIG. 2) which extend generally in a radially outwardly direction relative to respective shaft 30. (Elements 34 are schematically depicted only by profile in FIGS. 1 and 4).

Opposite end regions of each shaft 30 are coupled to respective arms 28 by means of a spherical bearing 36. Directing attention to FIG. 5, the bearing 36 has an outer housing 38 that is fixed to the arm 28 and an inner, swingable body 40 having a convex, spherical outer surface which is complemental to an inner concave spherical wall of housing 38. A bushing 42 rotatably received within body 40 carries three set screws (not shown) for releasably securing the end region of shaft 30 to bushing 42 and thereby the spherical bearing 36.

The bearings 36 represent a means mounting each shaft 30 on respective pairs of arms 28, 28 for swinging movement of each shaft 30 between positions parallel with the support 14 and any one of a number of positions wherein the longitudinal axis of the shaft 30 is inclined relative to the longitudinal axis of support 14. That is, when one of the arms 28 of a particular aerator unit 26 is pivoted to an inclination different than the inclination of the remaining arm 28 of such unit 26, the shaft 30 extending between the arms 28, 28 will assume a position at an angle relative to the normally horizontal support 14. On the other hand, when both of the arms 28, 28 of any one unit 26 are parallel, the spherical bearings 36 cause shaft 30 to return to a position in parallel alignment with the longitudinal axis of beam support 14.

Four spring assemblies, broadly designated 44 in FIGS. 1–4, are located along the transverse extent of implement frame 12 on opposite sides of aerator units 26. Each spring assembly 44 includes an elongated bar or member 46 having a lower end that is fixed to the top of support 14. Each member 46 extends upwardly at an angle and is secured in place by a vertical brace 48 (FIG. 2) having a lower region that is connected to rear areas of adjacent legs 22.

Each assembly 44 further includes a compression spring 50 having an upper or first end portion that is engageable with an upper region of the member 46 and a second or lower end portion remote from the first end portion that is engageable with a bracket 52. As perhaps viewed best in FIG. 3, bracket 52 is U-shaped in cross-sectional configuration and presents a bight engageable with the lower end of spring 50.

A means shiftably connecting each of the brackets 52 to an adjacent pair of arms 28 includes two pins or bolts 54 that are fixed to a respective arm 28 approximately mid-way between bearing 36 and pivot 24. Each bolt 54 is received within a slot 56 formed in the bracket 52, as can be realized by comparison of FIGS. 2 and 3.

The bolts 54 of the shiftable connecting means enable limited, independent, up and down swinging movement of adjacent pairs of arms 28, 28 relative to each other while enabling the compression spring 50 to bias either one or both of the adjacent arms 28 in a downwardly direction once the associated bolt 54 has reached the upper end of respective bracket slot 56. Furthermore, the shiftable connecting means comprising bolts 54 received in slots 56 enables limited independent movement of adjacent shafts 30 carrying the aerator elements 34 between positions of parallelism and non-parallelism relative to each other in accordance with the contour of the ground.

In each of the spring assemblies 44, a wall portion 58 (FIG. 3) defining an upper edge of each slot 56 of bracket 52 represents structure for enabling upward swinging movement of at least one of the arms 28 to be resisted by the weight of the frame 12 including support 14 whenever such arm 28 is pivoted upwardly past a predetermined inclination. Once bolt 54 has shifted along slot 56 into a position of contact with the upper wall portion 58, further upward swinging motion of the corresponding arm 28 causes spring 50 to be compressed, and as soon as the latter reaches a fully compressed orientation, further upward movement of the associated arm 28 is resisted by member 46 which in turn is fixedly secured to frame 12 including the transverse support 14.

A rod 60 extends through each of the springs 50 and is secured to an opening in the bight of the bracket 52, as is shown in FIG. 3. The rod 60 extends through a hole in the upwardmost portion of member 46, and the rod 60 includes an enlarged head or stop 62 on an opposite side of the member 46 relative to spring 50.

The rod 60, including stop 62, represents a means limiting the extent of downward swinging movement of the associated arms 28. For example, whenever one of the arms 28 swings downwardly about pivot 24 to cause bolt 54 to contact a wall of the associated bracket 52 at the lower end of slot 56, further downward movement of such arm 28 thereafter shifts the bracket 52 and thereby the rod 60 downwardly to a certain extent until stop 62 comes into engagement with the upper surface of member 46. Additional downward movement of arm 28 about pivot 24 is thereby precluded.

Finally, each of the aerator units 26 are preferably provided with a weight 64 to facilitate penetration of the aerator elements 34 into the ground as the implement 10 is advanced. As shown in FIGS. 1, 2 and 4, each weight 64 is carried by a rearwardmost portion of the pair of arms 28, 28 comprising each unit 26 at a location remote from the associated pivots 24, 24. Each side of each weight 64 has a horizontally extending slot 66 (see FIG. 1) which receives a body or bolt 68 connected to an angled, rear portion of the adjacent arm 28 (FIG. 4), and the slots 66 enable independent movement of the arms 28 regardless of the fact that the distance between the rearwardmost end portions of the arm 28 is variable. When arms 28, 28 shift toward different inclined positions.

As can now be appreciated by those skilled in the art, the provision of the spherical bearing 36 mounted on mid-regions of independently swingable arms 28 allows each of the aerator units 26 to rise, fall or tilt in accordance with the contour of the ground which is encountered by aerator elements 34 as the implement 10 is advanced across the field. Each of the aerator shafts 30 is movable from positions parallel relative to each other to positions non-parallel relative to each other in accordance with soil conditions and surface contour.

The spring assemblies 44 cooperate with weights 64 to urge the arms 28 and thereby the aerator elements 34 toward the ground. The compression springs 50 that are common to adjacent units 26 represent simplified apparatus for biasing both of the units 26 downwardly while enabling certain, limited independent movements of the associated arms 28, 28. Each spring 50 exerts the largest force on the upwardmost arm 28 of the associated arm pair since the bolt 54 of the adjacent, lowered arm 28 is simultaneously spaced from the upper wall portion 58 and shiftable in slot 56, free from the influence of spring 50.

Moreover, once any of the arms 28 is raised past an expected inclination, as perhaps may occur when particularly compacted or dense soil regions are encountered by the aerator elements 34, spring 50 is fully compressed and further upward swinging movement of the arm 28 is resisted by the substantial mass of the frame 12 including support 14. As a consequence, an additional force is presented for driving aerator elements 34 into the ground which is particularly advantageous in view of the fact that tightly compacted soil regions are, for the most part, in greatest need of aeration.

If relatively small lumps of earth are contacted by, for instance, only one of the units 26, the adjacent bolt 54 of such unit 26 raises in slot 56 until contacting upper wall portion 58. Further upward shifting of the unit 26 is resisted by compression of spring 50 and also by about one-half of the weight of the adjacent unit 26 when the bolt 54 of the latter reaches the lower limit of slot 56. In such a case, therefore, an additional force is presented to urge the raised unit 26 toward the ground.

Whenever use of the aerator 10 is to be suspended, the tractor or other towing vehicle merely raises the two lower links 20, 20, to lift the frame 12 away from the ground. Simultaneously, bolt 54 shifts toward the lower end of the corresponding slots 56 as the weight of each unit 26 swings arms 28 about pivots 24 until bolts 54 reach the lower end of slots 56. Further raising of the frame 12 causes extension of the springs 50 and the head or stop 62 of each rod 60 moves into a position of direct contact with the upper surface of corresponding members 46. As a result, the stop 62 will thereafter prevent further downward swinging movement of the arms 28 so that aerator elements 34 can be lifted from the ground as the frame 12 is raised.

We claim:

1. An aerator movable along a path of travel across the ground comprising:
   an elongated support extending in a normally generally horizontal direction and adapted for connection to a three-point hitch of a tractor;
   a pair of elongated arms each extending in a generally horizontal direction substantially transverse to the longitudinal axis of said support,
   each of said pair of arms having a forward end portion, a mid portion, and a rearward end portion;
   pivot means coupling said forward end portion of each of said arms to said support and enabling up and down swinging movement of each arm independently of the remaining arm;
   an aerator unit directly coupled to said mid portions of each of said arms and extending therebetween; and
   a weight carried by said arms in trailing disposition relative to said aerator unit as said aerator is advanced across the ground,
   said weight extending in a generally normally horizontal direction between said arms and rearwardly of said aerator unit and being shiftably coupled to said rear portion of each of said arms for enabling independent swinging movement of the latter in order to allow said aerator unit to follow the contours of the ground.

2. The invention as set forth in claim 1, wherein said weight includes walls defining a slot, and wherein said rear portion of each of said arms carries a body slidably received in said slot for shiftably connecting said weight to said arms.

3. A multiple unit aerator movable along a path of travel across the ground comprising:
   an elongated support extending in a normally generally horizontal direction transverse to said path of travel and adapted for connection to a three-point hitch of a tractor;
   a first and second pair of elongated arms each normally extending in a direction substantially parallel to said path of travel;
   pivot means coupling each of said arms to said support in spaced relationship to each other along the length of said support and enabling up and down swinging movement of each of said arms independently of the remaining arms;
   a first and second ground engageable aerator extending between said first and second pair of arms respectively;
   means mounting said first aerator unit on said first pair of arms for swinging movement of said unit between positions generally parallel with said support and any one of a number of positions inclined relative to said support as one of said arms of said first pair of arms swings toward an inclination different than the inclination of the other arm of said first pair of arms;
   means mounting said second aerator unit on said second pair of arms for swinging movement of said unit between positions generally parallel with said support and any one of a number of positions inclined relative to said support as one of said arms of said second pair of arms swings toward an inclination different than the inclination of the other arm of said second pair of arms; and yieldable biasing means associated with an adjacent pair of arms wherein one of said adjacent pair of arms is of said first pair of arms and the other of said adjacent pair of arms is of said second pair of arms, said biasing means having structure for imposing a biasing force on an uppermost one of either of said adjacent pair of arms while avoiding exertion of a biasing force on the remaining one of said adjacent pair of arms, and for shifting imposition of said biasing force to said remaining arm and relieving said force on said one arm as the latter moves to an inclination below said remaining arm, said biasing means structure including a bracket extending between said adjacent pair of arms at a location spaced from said support, means shiftably connecting said bracket means directly to each of said adjacent pair of arms at a location spaced from said support, and a spring engageable with said bracket means.

4. The invention as set forth in claim 3, wherein said bracket means includes wall defining a slot, and said shiftable connecting means includes a member fixed to one of said adjacent pair of arms and movably received in said slot.

5. The invention as set forth in claim 3, wherein said each of said arms includes a rear portion; and including a first and second weight extending between said rear portions of said first and second pair of arms respectively in trailing disposition to said first and second aerator units relative to said path of travel; and also including means shiftably coupling said first and second weight to said rear portion of said first and second pair of arms respectively for enabling independent, up and down swinging movement of the arms of each pair.

* * * * *